United States Patent
Johnson Campino et al.

(10) Patent No.: US 7,857,579 B2
(45) Date of Patent: Dec. 28, 2010

(54) SEALING ELEMENT FOR USE IN A FLUID-FLOW MACHINE

(75) Inventors: Nicolas Johnson Campino, Baden (CH); Jonas Hurter, Baden (CH); Markus Stemann, Freising (DE); Sergey Trifonov, Moskau (RU); Alexander Zagorskiy, Ennetbaden (CH)

(73) Assignee: Alstom Technology Ltd., Baden (CH)

( * ) Notice: Subject to any disclaimer, the term of this patent is extended or adjusted under 35 U.S.C. 154(b) by 351 days.

(21) Appl. No.: 11/838,530

(22) Filed: Aug. 14, 2007

(65) Prior Publication Data

US 2008/0213096 A1  Sep. 4, 2008

Related U.S. Application Data

(63) Continuation of application No. PCT/EP2006/050629, filed on Feb. 2, 2006.

(30) Foreign Application Priority Data

Feb. 15, 2005  (CH)  ..................... 258/05

(51) Int. Cl.
  *F01D 11/04*  (2006.01)
  *F04D 29/08*  (2006.01)
(52) U.S. Cl. .............. 415/110; 415/139; 415/138; 277/645; 277/930
(58) Field of Classification Search ......... 415/110, 415/111, 112, 135, 136, 137, 138, 139; 277/430, 277/431, 432, 408, 645, 930
See application file for complete search history.

(56) References Cited

U.S. PATENT DOCUMENTS 3,761,102 A  9/1973  Nicholson et al.

(Continued)

FOREIGN PATENT DOCUMENTS

| DE | 2135695 | 1/1972 |
| DE | 10306915 | 9/2004 |
| EP | 1306589 | 5/2003 |
| EP | 1521018 | 4/2005 |
| GB | 2303888 | 3/1997 |

*Primary Examiner*—Edward Look
*Assistant Examiner*—Dwayne J White
(74) *Attorney, Agent, or Firm*—Leydig, Voit & Mayer, Ltd.

(57) ABSTRACT

A sealing element for sealing a component gap with respect to a flow, in particular for use in a fluid-flow machine, specifically in a turbomachine is provided. In addition a fluid-flow machine is provided including such a sealing element for sealing a component gap. The sealing element includes a hollow profile enclosing a cavity. Arranged in the hollow profile are a first opening and a second opening, which are spaced apart from each other in the longitudinal direction of the hollow profile. The first opening is formed as an inlet opening for a cooling fluid into the cavity of the hollow profile, the second opening is formed as an outlet opening for the cooling fluid from the cavity of the hollow profile. With the sealing element arranged in a fluid-flow machine, the sealing element can consequently be internally cooled by means of the cooling fluid. Furthermore, the sealing element uses the pressure gradient occurring in the flow in the direction of flow to form a stable cooling fluid flow.

24 Claims, 5 Drawing Sheets

U.S. PATENT DOCUMENTS

| | | | |
|---|---|---|---|
| 4,767,260 A * | 8/1988 | Clevenger et al. | 415/115 |
| 5,240,263 A | 8/1993 | Nicholson et al. | |
| 5,975,844 A | 11/1999 | Milazar et al. | |
| 6,270,311 B1 * | 8/2001 | Kuwabara et al. | 415/110 |
| 6,675,584 B1 | 1/2004 | Hollis et al. | |
| 2004/0208748 A1 | 10/2004 | Schwartz et al. | |

* cited by examiner

SEALING ELEMENT FOR USE IN A FLUID-FLOW MACHINE

This application is a continuation of International Patent Application No. PCT/EP2006/050629, filed on Feb. 2, 2006, which claims priority to Swiss Patent Application No. CH 258/05, filed on Feb. 15, 2005. The entire disclosure of both applications is incorporated by reference herein.

The present invention relates to a sealing element for sealing a component gap with respect to a flow, in particular for use in a fluid-flow machine, specifically in a turbomachine. Furthermore, the invention relates to a fluid-flow machine in which such a sealing element is arranged for sealing a component gap.

BACKGROUND

In fluid-flow machines, such as in gas or steam turbines for example, component gaps cause the formation of bleed or leakage flows. This involves part of the working fluid of the main flow, which flows along a flow channel through the fluid-flow machine, penetrating into the component gaps adjacent the flow channel and escaping via these component gaps. Such component gaps that open out into the flow channel exist for example between platform-like shroud elements of the blading, which, arranged in series, form an inner or outer delimiting wall of the flow channel.

Bleed or leakage flows are generally undesired, since they no longer provide any contribution to the energy conversion and consequently, as a loss of the main flow, have to be balanced. Furthermore, in particular downstream of a combustion chamber, the working fluid is very hot. Bleed or leakage flows which originate from this hot flow are accordingly similarly very hot and can cause excess temperatures of the components adjacent the component gaps as a result of heat transfer.

In order to minimize bleed or leakage flows, it is usually attempted in the structural design to make the component gaps as small as possible. However, in the hot gas region in particular, minimum gaps between the components are often required to allow compensation for temperature-induced expansions of the components.

To minimize the bleed or leakage flows, it is therefore necessary to take suitable measures to seal the component gaps that are sometimes necessary for the purposes of expansion compensation against undesired penetration of working fluid. For example, for this purpose a cooling or sealing fluid may be blown out from the component gap concerned. The cooling or sealing fluid that is blown out fills the component gap and thereby prevents working fluid from penetrating into the component gap. In order also to be able to effectively prevent local flowing-in of working fluid into the component gap, the cooling or sealing fluid must however be blown out both in an adequate amount and with a sufficient positive pressure with respect to the working fluid. In particular in the region of the turbine inlet of a fluid-flow machine, the requirement for sufficient positive pressure of the cooling or sealing fluid is often not met, since the cooling or sealing fluid is usually branched off from the region of the compressor of the fluid-flow machine, and accordingly has only a low positive pressure. To assist the sealing effect and to minimize the required amount of cooling or sealing fluid, a strip seal is therefore often additionally placed into the component gap. For this purpose, the strip seal is arranged in the component gap in such a way that it at least constricts or largely blocks the component gap.

Such strip seals are known for example from EP 1 306 589 or DE 2 135 695.

In EP 1 306 589, a metallic, single- or multi-layer seal is described, comprising a half-open, singly or multiply curved profile, which is clamped into the gap to be sealed. The seal extends over the entire length of the component gap.

DE 2 135 695 discloses a sealing ring with a C-shaped cross section, in the case of which an annular spring is arranged between the legs to spread the sealing ring. Here, too, the seal extends over the entire length of the component gap.

By means of such strip seals, it would indeed be possible to seal a component gap virtually completely. However, in particular for cooling the components adjacent the component gap or for cooling the sealing element, it is often necessary to allow a certain throughput of cooling fluid through the component gap. In these cases, the aforementioned strip seals may be provided with openings, through which cooling fluid which is supplied to the component gap on the side of the component gap facing away from the working fluid flow is carried away into the main flow of the working fluid. For this purpose, a delivery pressure of the cooling fluid in the component gap has to be provided in such a way that a pressure gradient in the direction of the working fluid is ensured radially over the seal. If, however, the formation of a locally and temporally restricted positive pressure of the working fluid occurs during operation, there is the risk of the pressure gradient also being reversed. Hot working fluid is then at least temporarily forced out of the main flow into the component gap, and can lead here to material overheating of the components adjacent the component gap or else of the seal itself. A local positive pressure can be brought about for example by the blade tip running past the component gap and the pressure wave caused by this.

SUMMARY OF THE INVENTION

An object of the present invention is to provide a sealing element, a sealing arrangement and a fluid-flow machine with which one or more disadvantages of the prior art are reduced or avoided. In particular, the present invention provides a sealing element for sealing component gaps that exist in fluid-flow machines, by means of which a cooling fluid flow can be specifically directed out of the component gap into the main flow, effectively preventing fluid of the main flow from penetrating into the component gap even when a local pressure wave occurs within the main flow.

Furthermore, the invention provides a fluid-flow machine in which at least one component gap located in the fluid-flow machine is effectively sealed by means of a sealing element formed according to the invention.

The sealing element according to the invention for sealing a component gap with respect to a flow, in particular for use in a fluid-flow machine, specifically in a turbomachine, comprises a hollow profile with a length and a width and also, in the longitudinal direction of the hollow profile, with a first end and a second end. The hollow profile encloses a cavity. In order to be able to cool the sealing element internally by means of a cooling fluid flow, a first opening and a second opening are arranged in the hollow profile. The first opening is formed as an inlet opening for the cooling fluid into the cavity of the hollow profile. The second opening is formed as an outlet opening for the cooling fluid from the cavity of the hollow profile. Furthermore, the first opening and the second opening are arranged spaced apart at a distance from each other in the longitudinal direction of the hollow profile.

A cooling fluid supplied via the component gap therefore passes via the first opening into the cavity of the hollow profile, flows within the cavity in the longitudinal direction of the hollow profile and finally flows out via the second opening to the cavity. The internal flow of the cooling fluid produced in the cavity has the effect that the sealing element undergoes active cooling. The sealing element can, as a consequence, be exposed to a higher temperature of the adjacent main flow than would be the case without cooling.

The spacing of the first opening in relation to the second opening has the effect on the one hand of determining which portion of the hollow profile is internally flowed through by the cooling fluid. On the other hand, the spacing of the first opening in relation to the second opening has the effect of reliably ensuring that fluid of the main flow does not flow into the component gap even in the case of a temporary, local pressure wave of the main flow. The reason for this is that the cooling fluid flow in the cavity of the hollow profile forms a pressure gradient between the first opening and the second opening. The pressure gradient corresponds here approximately to the sum of the pressure loss which the cooling fluid flow undergoes as it flows through the cavity and the kinetic pressure of the cooling fluid flow as it leaves the second opening. In order for working fluid from the main flow to be able to get into the sealed part of the component gap, the pressure gradient present in the cavity would first have to be overcome by the working fluid in the reverse direction, and there would have to be a reversal of the direction of flow in the hollow profile. Since, however, pressure waves of the main flow, as can typically occur in fluid-flow machines, only act over a short time period, these pressure waves are completely or virtually completely dissipated and evaporated in the cavity of the hollow profile. A pressure wave typically occurring in fluid-flow machines can consequently advance at most as far as the cavity of the hollow profile. This ensures in particular that no fluid of the main flow get into the sealed region of the component gap.

Furthermore, the spacing of the first opening in relation to the second opening allows the arrangement of the second opening, i.e. the outlet opening from the cavity of the hollow profile, to be advantageously chosen such that as far as possible no pressure waves, or only diminished pressure waves, of the main flow occur in the region of the outlet opening and/or that the pressure level of the main flow in the region of the outlet opening is on average lower than in the region of the inlet opening. The first can be achieved for example by the second opening being arranged in an intermediate space of the flow channel that is free from blading, for example in the intermediate space between a rotor and a stator arranged downstream of the rotor of the fluid-flow machine or downstream of the stator. The pressure waves in the housing region that are caused by the blade tips running past the rotor already occur in a much diminished form in the intermediate space between the rotor and the stator. Downstream of the stator, these pressure waves are even less intense.

A pressure level of the main flow that is lower on average is usually obtained in a turbine by the second opening being arranged downstream of the first opening. In a compressor, a pressure level of the main flow that is lower on average is usually obtained by the second opening being arranged upstream of the first opening.

The distance between the first opening and the second opening is expediently chosen such that, with the sealing element arranged in a fluid-flow machine, an average static pressure of the main flow in the region of the second opening occurring during the operation of the fluid-flow machine is lower than an average overall pressure of the cooling fluid at the inlet into the first opening. The pressure gradient of the cooling fluid flow between the inlet opening and the outlet opening consequently represents as it were a fluidic resistance for the fluid of the main flow, by which penetration of fluid of the main flow into the cavity of the hollow profile of the sealing element and further into the component gap is effectively prevented.

The hollow profile of the sealing element expediently comprises a first side, which, with the sealing arrangement arranged in a fluid-flow machine, is facing toward the main flow, and a second side, which, with the sealing element arranged in the fluid-flow machine, is facing away from the main flow. The inlet opening is then expediently arranged on the second side of the hollow profile, the outlet opening on the first side of the hollow profile. Consequently, with the sealing element arranged in a component gap or adjacent the component gap, the inlet opening opens out into the sealed region of the component gap, whereas the outlet opening opens out indirectly or directly into the main flow. Indirectly means here that the outlet opening can also open out initially into an end portion of the component gap, which then opens out into the main flow.

It is usually expedient to configure the hollow profile with a rectangular cross section or an approximately rectangular cross section, with a first side and a second side and also with two side faces lying opposite each other. The cavity of the hollow profile is then also expediently to be configured in a rectangular form, whereby largely constant wall thicknesses of the hollow profile can be realized.

In order to ensure that the cooling fluid flows through the entire length of the cavity, the inlet opening is expediently arranged adjacent the first end of the hollow profile and the outlet opening adjacent the second end of the hollow profile.

The sealing element is expediently developed as a high-temperature seal. For this, the first side of the hollow profile, facing toward the flow, is for example expediently produced from a high-temperature-resistant material or coated with a high-temperature-resistant material. The first side of the sealing element can therefore be exposed to a higher temperature.

Furthermore, at least one side face of the hollow profile is preferably produced from a resilient material. The side face can therefore be kept under prestress, in particular by the clamping of the side face in between two projections.

Alternatively or additionally, the at least one side face of the hollow profile is expediently configured with an actively resilient contour. The actively resilient contour also makes it possible for the side face to be secured under prestress. The actively resilient contour of the at least one side face may be formed for example in the manner of a concertina or in a half-round and/or half-oval manner or approximately half-round and/or approximately half-oval manner.

Furthermore, the invention provides a sealing arrangement for use in a flow channel which is flowed through by a working fluid and which comprises at least one delimiting wall. The flow of the working fluid here has a pressure gradient in the direction of flow. Furthermore, the delimiting wall comprises a component gap with at least two gap side faces. To seal the component gap with respect to the working fluid, a sealing element as described above, formed according to the invention, is arranged in the component gap or in the region of the component gap.

In a further aspect, the invention provides a fluid-flow machine, in particular a turbomachine, with a flow channel which comprises at least one delimiting wall and is flowed through by a working fluid during the operation of the fluid-flow machine, the delimiting wall comprising a component gap with at least two gap side faces, and a sealing element according to the above description being arranged in the component gap to seal the component gap with respect to the working fluid.

The arrangement of the sealing element is particularly effective in the case of a component gap which extends in the direction of flow of the working fluid or substantially in the direction of flow of the working fluid. However, the invention can also be used in the case of component gaps which extend differently from this with respect to the direction of flow of the working fluid.

The component gaps running between two flow-channel-delimiting platforms, for example between two blade shroud elements, may be mentioned here as typical component gaps that can be sealed very effectively by means of the invention.

It is assumed here that the flow of the working fluid during the operation of the fluid-flow machine forms a pressure gradient over the length of the component gap to be sealed or over at least part of the length of the component gap to be sealed, with a region of higher pressure and a region of lower pressure of the flow. The inlet opening is then expediently arranged at the level of the higher pressure and the outlet opening at the level of the lower pressure.

If the component gap runs in the direction of the flow and no technical work or other impulse input is imparted to the flow, such a pressure gradient is given by the pressure losses in the direction of flow occurring in a flow. The inlet opening is then expediently arranged upstream of the outlet opening, considered in the direction of flow.

According to an expedient application of the invention, the component gap is arranged in a turbine of the fluid-flow machine. Furthermore, the component gap extends in the direction of flow of the working fluid or substantially in the direction of flow of the working fluid. According to the invention, the outlet opening is then arranged downstream of the inlet opening in the direction of flow of the working fluid and therefore uses the pressure gradient existing in the turbine to stabilize the cooling fluid flow within the hollow profile. Penetration of hot gas of the turbine flow into the region of the component gap that is sealed by the sealing element is hereby effectively prevented. Therefore, pressure waves occurring in the turbine flow, as are caused for example by the blade tips of the blading of a turbine rotor, have the effect at most that hot fluid of the turbine flow gets into the region of the inlet opening. It has been found here, however, that the time period of such pressure waves usually occurring in fluid-flow machines is not adequate, even with great amplitudes of the pressure waves, to reverse the cooling fluid flow in the hollow profile of the sealing element, whereby hot fluid of the turbine flow would get into the region of the component gap that is sealed by the sealing element.

It is preferred for the second opening to open out into a blade-free intermediate space of the flow channel. Pressure waves that are caused by blade tips are already greatly damped when they occur in the blade-free intermediate spaces. Such blade-free intermediate spaces exist for example between a rotor and the following stator or at the outlet from the stator upstream of the inlet into a further rotor.

In particular whenever the cooling fluid has not yet been spent for cooling purposes at the outlet from the hollow profile, it may also be advantageous, however, to allow the second opening of the hollow profile to open out into a further cooling channel.

According to a preferred configuration of the invention, the first opening and the second opening are spaced apart from each other by at least approximately the width of a blade. The width of a blade refers to the extent of the blade, considered in the direction of flow. In particular in cases in which a buildup of a pressure wave has occurred on account of the stagnation point flows caused by the blades at the leading blade edge, and as a result an inflow of hot fluid into an adjacent component gap has occurred, it is often sufficient to arrange the inlet opening in the region of the leading blade edge and the outlet opening directly downstream of the blade.

To be able to use a higher pressure gradient of the flow, however, it will be expedient in many applications to space the first opening apart from the second opening by approximately a width of a stage of the fluid-flow machine. The width of a stage refers to the extent of the stage, considered in the direction of flow. The term a stage of a fluid-flow machine, with which a person skilled in the art is familiar, refers here merely to the paired arrangement of a rotor and a stator. Furthermore, the width refers to the dimension of the stage considered in the direction of throughflow. On the one hand, with the first opening and the second opening arranged at a distance from each other of approximately a width of a stage, it is ensured that the pressure gradient of the main flow is sufficient to form a stable cooling fluid flow within the hollow profile. This also applies to those cases in which the cooling fluid at the inlet into the hollow profile has a pressure that is equal to or only slightly higher than the main flow at the level of the inlet opening. On the other hand, an excessive pressure gradient, which would increase the mass throughput of cooling fluid and consequently the cooling fluid requirement, also does not form here.

Furthermore, a cooling fluid supply expediently opens out into the region of the component gap that is sealed by the sealing element. The cooling fluid is supplied during the operation of the fluid-flow machine via the cooling fluid supply to the sealed region of the component gap and passes from here via the inlet opening into the hollow profile of the seal.

According to a further expedient refinement of the invention, a groove in which the hollow profile engages on the longitudinal side is arranged in a gap side face to fix the sealing element in the component gap.

For this purpose, the hollow profile of the sealing element is preferably clamped in the groove along one side face of the hollow profile and is thereby fixed in the component gap.

To fix the sealing element in the component gap, a groove is preferably formed respectively in each of the two gap side faces, the grooves lying opposite each other in such a way that the hollow profile can engage with a respective longitudinal side in a respective groove.

BRIEF DESCRIPTION OF THE DRAWINGS

The invention is explained in more detail below on the basis of exemplary embodiments illustrated in the figures, in which.

In the figures, only elements and components that are essential for the understanding of the invention are represented. The exemplary embodiment represented is to be understood as being purely instructive and is intended to serve for better understanding but not for restricting the subject matter of the invention.

DETAILED DESCRIPTION

Figure 1:
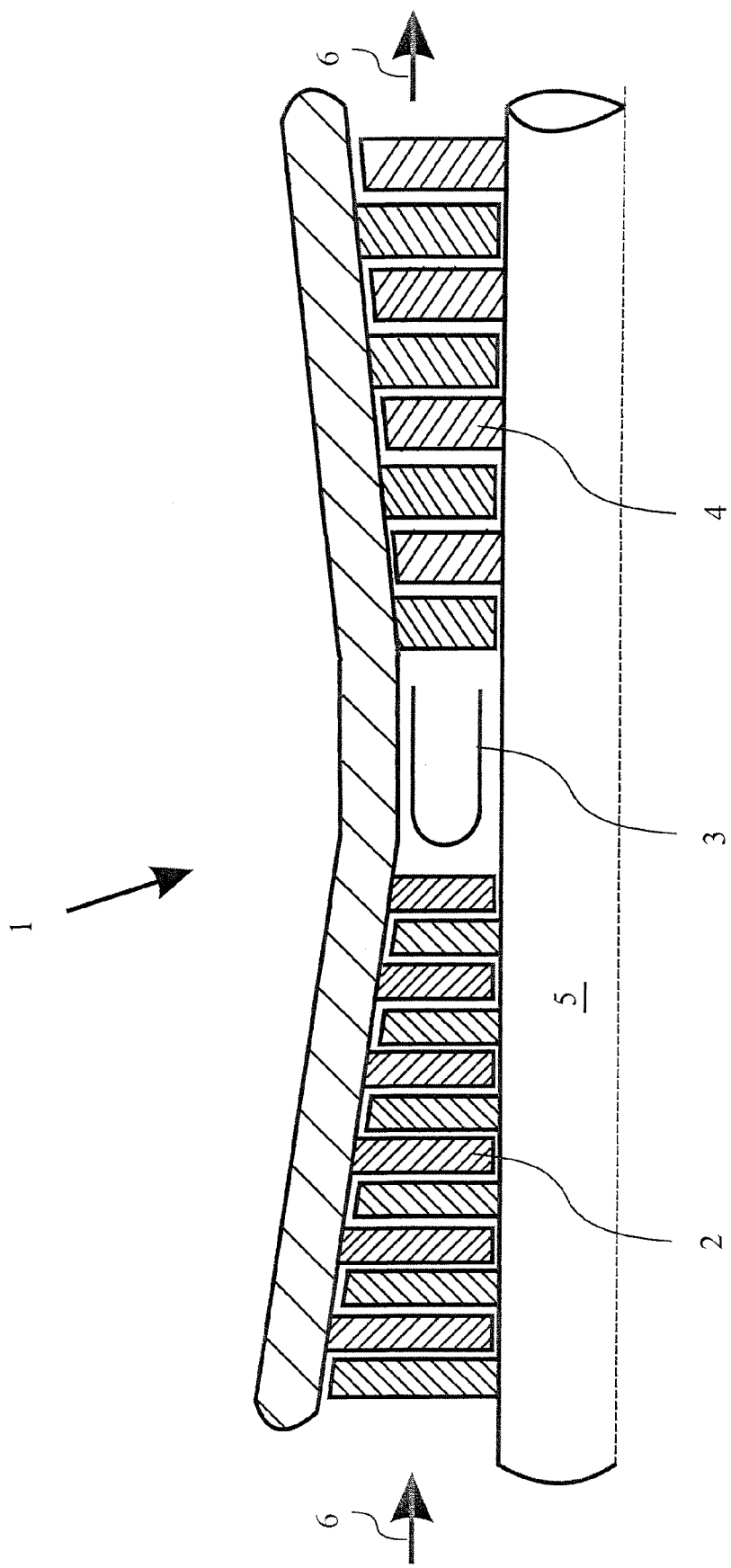
FIG. 1 shows a gas turbine in a schematized representation.

In FIG. 1, a gas turbine 1 known from the prior art is represented in a schematized representation. Such gas turbines are used for example in power generating plants for generating electric power and represent a typical area of application of the invention. The sealing element formed according to the invention may, however, also be used in fluid-flow machines used in other ways, such as for example in fluid-flow machines which are used in process plants or for generating propulsive power.

The gas turbine 1 comprises as essential components, represented in FIG. 1, a compressor 2, a combustion chamber 3 and a turbine 4. The compressor 2 and the turbine 4 are connected to each other in a rotationally fixed manner by means of a shaft 5. Furthermore, the compressor 2, the combustion chamber 3 and the turbine 4 form a flow path, which is indicated in FIG. 1 by the flow arrow 6. During the operation of the gas turbine 1, a working fluid, usually air, flows along the flow path through the gas turbine 1. Not represented in FIG. 1 is a generator, which is drive-connected to the shaft of the gas turbine and is driven by the gas turbine to generate electric power. The construction, operating mode and technical developments of gas turbines of the type represented in FIG. 1 are sufficiently known to a person skilled in the art from the prior art, for which reason further explanation is not given at this point.

Figure 2:
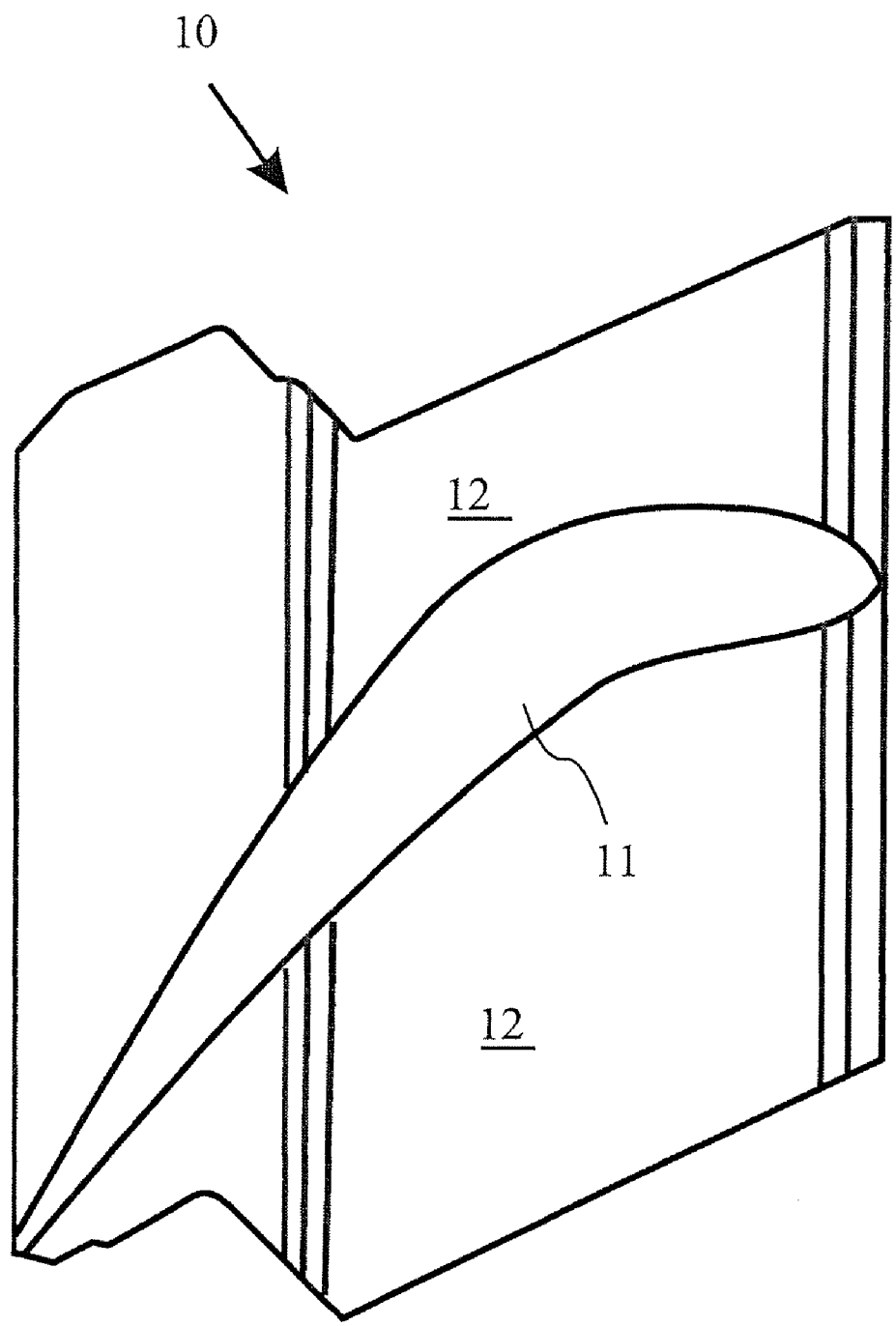
FIG. 2 shows a plan view of a stator blade with a shroud element arranged at the blade root.

The blades of compressors and turbines of such gas turbines are often equipped with platform-like shroud elements, which are arranged at the blade roots and/or at the blade heads of the blades. FIG. 2 shows by way of example a plan view of a stator blade 10 with a blade airfoil 11 and a shroud element 12, arranged at the blade root. If such blades, formed with one or two shroud elements, are arranged in series at the circumference of a compressor or a turbine, the shroud elements of neighboring blades are adjacent one another. The shroud elements arranged in series at the circumference of the compressor or the turbine have the overall effect of forming an inner ring and/or an outer ring. The inner ring or outer ring formed in this way serves as a delimitation of the flow channel through which the working fluid flows during the operation of the fluid-flow machine. This flow of the working fluid is also referred to as the main flow of the fluid-flow machine.

Between the shroud elements arranged in series at the circumference of the fluid-flow machine, however, a gap, albeit a small gap, remains in each case, running in the direction of flow of the working fluid. Some of these gaps may even be desired, in order for example to be able to compensate for thermally induced expansions of the components. However, working fluid from the flow channel penetrates into these gaps during the operation of the fluid-flow machine and passes from here into the rear, internal component structure of the fluid-flow machine. One disadvantage of this is that the working fluid escaping in this way as bleeding air cannot make any further contribution to the energy conversion, and consequently represents a leakage flow of the fluid-flow machine. On the other hand, in particular in the region of the turbine, the working fluid often has a very high temperature, which lies above the maximum permissible component temperature of the rear components of the fluid-flow machine. As a consequence, overheating may occur, and as a result destruction of the components concerned.

These statements also apply of course to the component gaps opening out into the flow channel.

To seal such component gaps, it is known from the prior art to provide the component gap with a seal largely sealing the component gap. In order additionally to be able to cool seals that are subjected to high thermal loading, it is also known to supply the component gap additionally with cooling air, which is then blown past the seal or blow in through defined through-openings in the seal, into the main flow. The pressure of the cooling air is thereby generally set such that there is a pressure gradient radially over the seal in the direction of the hot main flow. The creation of a temporary, locally restricted positive pressure of the main flow, which may be caused for example by a pressure wave at the blade tip of a blade moved past the component gap, can however cause a reversal of the pressure gradient, whereby hot working fluid is forced into the sealing gap. This can then have the consequence that the seal and components adjacent the component gap are no longer sufficiently cooled and are damaged as a result of overheating.

Figure 3:
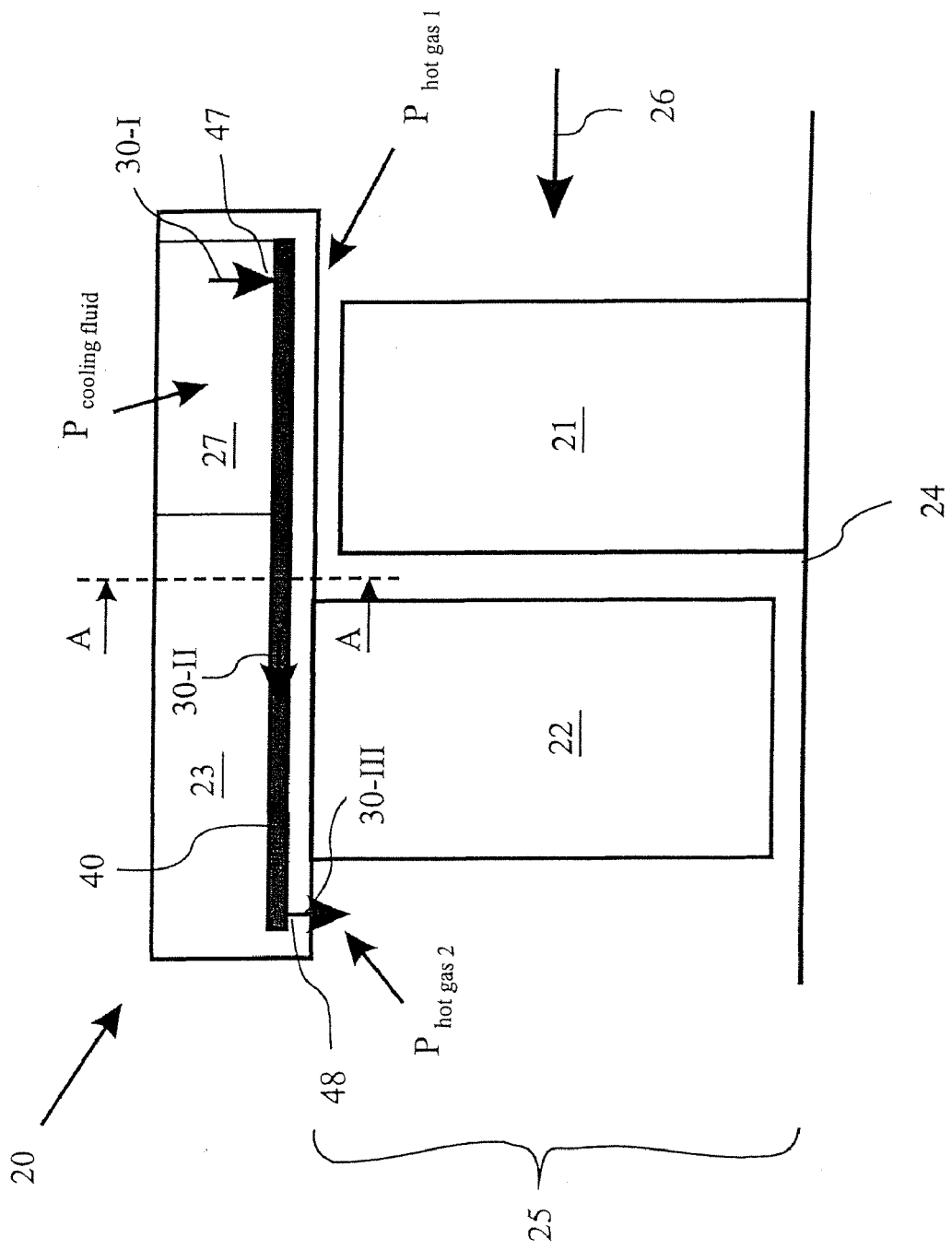
FIG. 3 shows a section through a turbine stage with a seal arranged according to the invention.
Figure 4:
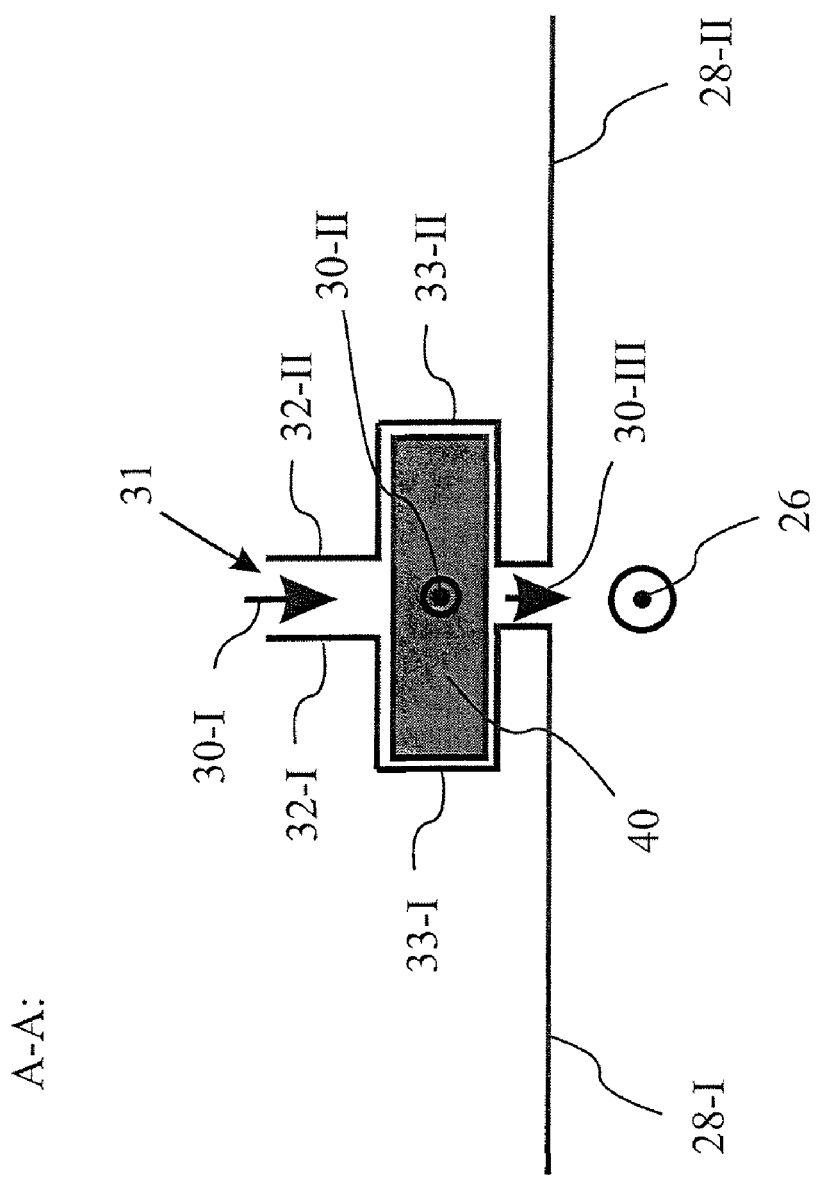
FIG. 4 shows a seal arrangement from FIG. 3 in a front view.

This is where the invention comes in. FIG. 3 shows a section through a turbine stage 20, which has a component gap 31 (represented in FIG. 4). Arranged in the component gap 31 is a sealing element 40 formed according to the invention. FIG. 4 shows a section through the component gap 31 of the turbine stage 20 along the sectional line A-A indicated in FIG. 3.

The turbine stage 20, represented in a schematized form in FIG. 3, comprises a rotor and a stator arranged downstream of the rotor, the rotor being reproduced in FIG. 3 only by a rotor blade 21 and the stator only by a stator blade 22. Furthermore, the term a 'turbine stage' refers here merely to the paired arrangement of a rotor and a stator and not, as otherwise usually customary, to the fixed sequence of the arrangement in such a way that in a turbine there is first a stator and then a rotor follows downstream of the stator.

The flow channel 25 of the turbine stage 20, which is flowed through by the working fluid according to the flow arrow 26 during the operation of the fluid-flow machine, is delimited on the rotor side by the rotor shaft 24 and on the housing side (identified in FIG. 3 by reference numeral 23) by platform-like shroud elements arranged in series at the circumference of the flow channel. FIG. 4 shows the arrangement in series of two housing-side shroud elements 28-I and 28-II. As FIG. 4 reveals, between the two shroud elements 28-I and 28-II arranged in series at the circumference there remains a component gap 31, which in the exemplary embodiment represented here extends over the entire turbine stage 20 in the axial direction of the turbine-flow machine. In axial fluid-flow machines, the axial direction of the fluid-flow machine corresponds to the longitudinal direction 26 of the flow of the working fluid. The component gap 31 is in turn delimited by two gap side faces 32-I and 32-II. In addition, the component gap 31 may also be delimited at the upstream end and/or at the downstream end by further gap side faces (not represented here).

In order to seal the component gap 31 with respect to the hot working fluid flowing in the flow channel 25 during the operation of the fluid-flow machine, a sealing element 40 according to the invention is arranged in the component gap 31. A sealing element 40 suitable for arrangement in the component gap is perspectively represented by way of example in FIG. 5.

The sealing element 40 comprises a hollow profile 41, which encloses a cavity 42. The hollow profile 41 has a longitudinal direction L and a widthwise direction B, with a first end 46-I, considered in the longitudinal direction L, and a second end 46-II, considered in the longitudinal direction L. The sealing element 40 may, however, also be configured with a much greater length in the longitudinal direction L than the length represented.

Figure 5:
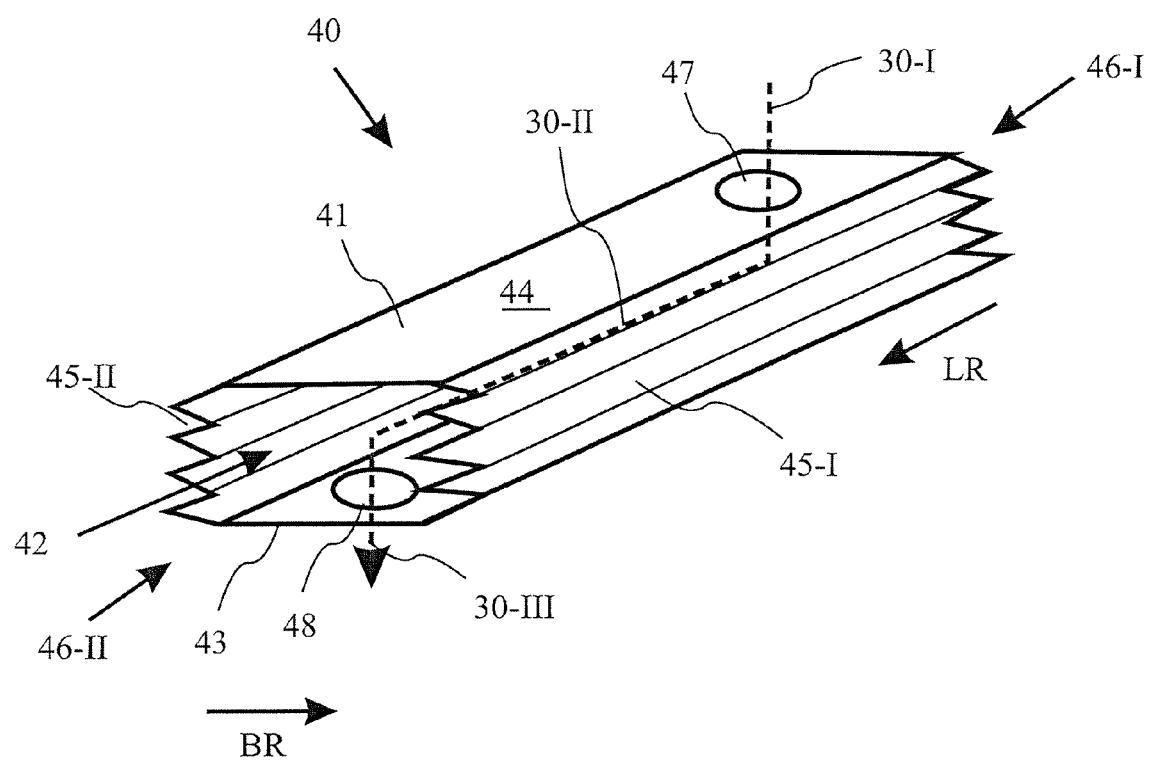
FIG. 5 shows a sealing element configured according to the invention in a perspective view.

Furthermore, the hollow profile 41 represented in FIG. 5 has an approximately rectangular cross section, with a first side 43, a second side 44 and with two side faces 45-I and 45-II lying opposite each other. With the sealing element 40 arranged in the fluid-flow machine according to FIG. 3, the first side 43 is facing toward the main flow of the fluid-flow machine, the second side 44 facing away from the main flow.

In order to increase the temperature resistance, the first side 43 of the hollow profile 41 is produced here from a high-temperature-resistant material.

The side faces 45-I and 45-II of the hollow profile 41, which are concertina-shaped, and consequently formed with an actively resilient contour, are produced from a resilient material.

Furthermore, a first opening 47 is arranged on the second side 44 of the hollow profile 41 and a second opening 48 is arranged on the first side 43 of the hollow profile 41. The first opening 47 is arranged near the first end 46-I of the hollow profile 41 and is formed as an inlet opening for cooling fluid into the cavity 42 of the hollow profile 41. The second opening 48 is arranged near the second end 46-II of the hollow profile 41 and is formed as an outlet opening for cooling fluid from the cavity 42 of the hollow profile 41.

As represented in FIG. 5, the first opening 47 and the second opening 48 are consequently arranged spaced apart at a distance A from each other in the longitudinal direction L of the hollow profile 41. By contrast with this, in the case of a through-opening the two openings would be arranged on a line joining one to the other, i.e. in line with each other.

As FIG. 3 reveals, the first opening 47 and the second opening 48 are spaced apart from each other here by somewhat more than the width of the turbine stage 20 represented in FIG. 3.

The spaced-apart arrangement of the first opening 47 from the second opening has the effect that the cooling fluid flowing into the cavity 42 of the hollow profile 41 through the first opening 47, formed as the inlet opening, is forced to flow initially in the longitudinal direction L of the hollow profile 41 in the cavity 42 before it can leave the cavity 42 of the hollow profile 41 again via the second opening 48, formed as the outlet opening. As a result, the hollow profile 41 of the sealing element 40 is internally cooled.

Furthermore, the distance between the first opening 47 and the second opening 48 is expediently to be chosen such that, with the sealing element 40 arranged in the fluid-flow machine, a static pressure of the main flow in the region of the second opening 48 occurring during the operation of the fluid-flow machine is lower on average than an overall pressure of the cooling fluid at the inlet into the first opening 47. In the arrangement represented in FIG. 3 of the sealing element 40 in the turbine stage 20, this condition is satisfied in a simple way by the second opening 48 being arranged downstream of the first opening 47 in the direction of flow 26 of the working fluid. The overall pressure of the cooling fluid at the inlet into the first opening 47 is here just slightly above the static pressure of the main flow at the level of the first opening. Since a flow in a turbine is always affected by loss, a pressure drop occurs in the main flow of the turbine stage 20 in the direction of flow of the working fluid. The second opening 48 is consequently automatically arranged at the level of a lower pressure level of the flow than the first opening 47.

The sealing element 40 configured in this way according to the invention consequently uses the pressure gradient of the main flow in the axial direction and not, like conventional seals, the radial pressure gradient.

Apart from the effect of the internal cooling of the hollow profile 41, the spaced-apart arrangement of the inlet opening 47 in relation to the outlet opening 48 also ensures that, even in the case of a pressure wave occurring in the main flow, no working fluid gets into the sealed region of the component gap 31. In the exemplary embodiment represented in FIG. 3, for this purpose the outlet opening opens out into a blade-free intermediate space of the flow channel downstream of the stator. In blade-free intermediate spaces, there is a very rapid reduction of pressure waves caused for example by the blade tips of the preceding blades. On the other hand, even in the case of a briefly occurring high pressure wave of the hot main flow, no flow reversal occurs within the hollow profile 41 on account of the damping effect of the cooling fluid flow carried in the hollow profile 41. Consequently, hot fluid of the main flow can be effectively prevented from getting into the component gap 31 with the aid of the sealing element formed according to the invention. At most there could be a slight inflow of working fluid into the outlet opening 48 of the hollow profile 41 if there are pressure waves with very high amplitudes or long effective duration. However, on account of the only very small amount of inflowing fluid of the main flow even in the maximum case, thermal overloading of the sealing element 40 would not occur in this case either.

As shown in a basic representation in FIG. 4, arranged in both side faces 32-I and 32-II there is respectively a groove 33-I and 33-II. The grooves 33-I and 33-II are located at the same level as each other. The sealing element 40 is fixed in the component gap 31 by longitudinal engagement of the hollow profile 41 respectively in the grooves 33-I and 33-II, i.e. a side face 45-I and 45-II of the hollow profile 41 respectively engages in one of the grooves 33-I and 33-II each.

In order to fix the sealing element securely in the component gap and additionally seal the groove connection, the side faces 45-I and 45-II of the hollow profile 41 are clamped in the grooves. (The clamping is not shown in FIG. 4.) To assist the clamping, the side faces 45-I and 45-II are formed in the manner of a concertina and produced from a resilient material. The restoring forces induced during clamping of the side faces leads to effective and operationally secure fixing and sealing of the groove connection.

The sealing element described here and the arrangement of the sealing element in a fluid-flow machine represent only embodiments of the invention that are given by way of example, which can certainly be added to and/or modified in a wide variety of ways by a person skilled in the art without departing from the idea of the invention.

For example, no cooling fluid supply is represented in FIGS. 3 and 4, but must of course be present to transport cooling fluid into the component gap. Here, the cooling fluid supply opens out into the region of the component gap sealed by the sealing element.

The second opening may, for example, also open out into a further cooling channel, instead of into the main flow, and only then be discharged into the main flow. This is appropriate in particular whenever the cooling air has not yet been spent in cooling terms after flowing through the sealing element.

The arrangement of a sealing element has also only been explained on the basis of a bladed flow channel, i.e. for a turbine or for a compressor. However, the same principle may also be used for example in combustion chambers, the combustion chamber pressure gradient here being used as the axial pressure gradient along the sealing element.

The use of the pressure element according to the invention is also not restricted just to high-temperature applications, but instead the sealing element according to the invention can also be used in the case of lower fluid temperatures.

What is claimed is:

1. A sealing element for sealing a component gap in a fluid-flow machine with respect to a flow carried in a flow channel, the sealing element comprising:
a hollow profile having a length extending in a longitudinal direction and a width and having first and second longitudinal ends and first and second sides enclosing a cavity;
an inlet opening disposed on the second side for flowing a cooling fluid from the second side into the cavity; and
an outlet opening disposed on the first side for flowing the cooling fluid from the cavity to the first side, wherein the inlet opening and the outlet opening are spaced apart at a distance from each other in the longitudinal direction, so as to enable a flow of the cooling fluid in the longitudinal direction.

2. The sealing as recited in claim 1, wherein the distance between the first opening and the second opening is such that, with the sealing arrangement disposed in the fluid-flow machine, a static pressure of the flow at a region of the outlet opening occurring during the operation of the fluid-flow machine is lower on average than an overall pressure of the cooling fluid at the inlet opening.

3. The sealing element as recited in claim 1, wherein the sealing element is disposed in the fluid-flow machine such that the first side faces toward the flow and the second side faces away from the flow.

4. The sealing element as recited in claim 1, wherein the hollow profile includes a third side and a fourth side and at least approximately rectangular cross section, the first and second sides being disposed opposite each other and the third and fourth sides being disposed opposite each other.

5. The sealing element as recited in claim 4, wherein at least one of the third and fourth sides includes a resilient material.

6. The sealing element as recited in claim 4, wherein at least one of the third and fourth sides includes an actively resilient contour.

7. The sealing element as recited in claim 6, wherein the actively resilient contour is formed in the manner of a concertina.

8. The sealing element as recited in claim 6, wherein the actively resilient contour is formed in a half-round or half-oval manner or approximately half-round and/or approximately half-oval manner.

9. The sealing element as recited in claim 1, wherein the inlet opening is disposed adjacent the first end and the outlet opening is disposed adjacent the second end.

10. The sealing element as recited in claim 1, wherein the sealing element is a high-temperature seal.

11. The sealing element as recited in claim 10, wherein the first side includes a high-temperature-resistant material.

12. A sealing element for use in a flow channel having at least one delimiting wall and receiving a flow of a working fluid, wherein the flow of the working fluid flow has a pressure gradient in a direction of flow and the delimiting wall includes a component gap having at least two gap side faces, the sealing element comprising:
a hollow profile disposed in a region of the component gap and having a length extending in a longitudinal direction and a width and having first and second longitudinal ends and first and second sides enclosing a cavity;
an inlet opening disposed on the second side for flowing a cooling fluid from the second side into the cavity; and
an outlet opening disposed on the first side for flowing the cooling fluid from the cavity to the first side, wherein the inlet opening and the outlet opening are spaced apart at a distance from each other in the longitudinal direction, so as to enable a flow of the cooling fluid in the longitudinal direction.

13. A fluid-flow machine comprising:
a flow channel having at least one delimiting wall including a component gap with at least two side faces, the flow channel receiving a flow of a working fluid during operation of the fluid-flow machine, the flow of the working fluid flow having a pressure gradient in a direction of the flow;
a sealing element disposed in the component gap, wherein the sealing element includes a hollow profile having a length extending in a longitudinal direction and a width and having first and second longitudinal ends and first and second sides enclosing a cavity, an inlet opening disposed on the second side for flowing a cooling fluid from the second side into the cavity, and an outlet opening disposed on the first side for flowing the cooling fluid from the cavity to the first side, wherein the inlet opening and the outlet opening are spaced apart at a distance from each other in the longitudinal direction, so as to enable a flow of the cooling fluid in the longitudinal direction.

14. The fluid-flow machine as recited in claim 13, wherein the component gap extends substantially in the direction of flow of the working fluid.

15. The fluid-flow machine as recited in claim 13, wherein at least one side face of the component gap includes a groove, and wherein the one of the first and second sides of the hollow profile engages with the groove so as to fix the sealing element in the component gap.

16. The fluid-flow machine as recited in claim 13, wherein the pressure gradient includes a region of higher pressure and a region of lower pressure, and wherein the inlet opening is disposed in the region of the higher pressure and the outlet opening is disposed in the region of the lower pressure.

17. The fluid-flow machine as recited in claim 13, further comprising a turbine and wherein the component gap is disposed in the turbine extends substantially in the direction of flow, and the outlet opening is disposed downstream of the inlet opening.

18. The fluid-flow machine as recited in claim 13, further comprising a turbine and wherein the outlet opening opens out into a blade-free intermediate space of the flow channel.

19. The fluid-flow machine as recited in claim 13, further comprising a turbine and wherein the distance is at least a width of a blade of the turbine.

20. The fluid-flow machine as recited in claim 13, wherein the distance is at least a width of a stage of the fluid-flow machine.

21. The fluid-flow machine as recited in claim 13, wherein a supply of the cooling fluid opens out into a region of the component gap that is sealed by the sealing element.

22. The fluid-flow machine as recited in claim 13, wherein the outlet opening opens out into a further cooling channel.

23. The fluid-flow machine as recited in claim 13, wherein the component gap is formed between two flow-channel-delimiting shroud elements.

24. The fluid flow machine as recited in claim 13, wherein the fluid-flow machine is a turbomachine.

* * * * *